United States Patent [19]

Chum et al.

[11] Patent Number: 4,964,995
[45] Date of Patent: Oct. 23, 1990

[54] SUPERCRITICAL SEPARATION PROCESS FOR COMPLEX ORGANIC MIXTURES

[75] Inventors: Helena L. Chum, Arvada, Colo.; Giuseppe Filardo, Palermo, Italy

[73] Assignee: Midwest Research Institute, Kansas City, Mo.

[21] Appl. No.: 368,170

[22] Filed: Jun. 16, 1989

[51] Int. Cl.$^5$ ............................................. B01D 11/00
[52] U.S. Cl. ................................ 210/634; 210/639; 210/928; 162/14; 162/16; 203/16; 203/26; 203/49
[58] Field of Search .............. 210/634, 639, 928; 162/14, 16; 203/16, 26, 49

[56] References Cited

U.S. PATENT DOCUMENTS

| | | | |
|---|---|---|---|
| 2,631,966 | 3/1953 | Francis | 196/14.2 |
| 2,632,030 | 3/1953 | Francis | 196/14.2 |
| 2,698,278 | 12/1954 | Francis | 196/13 |
| 2,772,965 | 12/1956 | Gray | 162/14 |
| 3,478,109 | 11/1969 | McConnell | 210/634 |
| 3,825,526 | 7/1974 | Forss | 210/634 |
| 3,969,196 | 7/1976 | Zosel | 203/49 |
| 4,349,415 | 9/1982 | DeFilippi | 203/17 |
| 4,437,939 | 3/1984 | Bhise | 203/16 |
| 4,457,812 | 7/1984 | Rado | 210/634 |
| 4,474,994 | 10/1984 | Makim | 568/438 |
| 4,494,604 | 1/1985 | Shaw | 210/634 |
| 4,528,100 | 7/1985 | Zarchy | 210/634 |
| 4,547,292 | 10/1985 | Zarchy | 210/634 |
| 4,568,447 | 2/1986 | Pujado | 210/634 |
| 4,584,057 | 4/1986 | Rowe | 162/16 |
| 4,617,090 | 10/1986 | Chum | 162/16 |
| 4,664,832 | 5/1987 | Sandvig | 162/16 |
| 4,728,393 | 3/1988 | Reel | 162/16 |
| 4,770,780 | 9/1988 | Moses | 210/634 |

*Primary Examiner*—Ernest G. Therkorn
*Attorney, Agent, or Firm*—Ken Richardson

[57] ABSTRACT

A process is disclosed for separating low molecular weight components from complex aqueous organic mixtures. The process includes preparing a separation solution of supercritical carbon dioxide with an effective amount of an entrainer to modify the solvation power of the supercritical carbon dioxide and extract preselected low molecular weight components. The separation solution is maintained at a temperature of at least about 70° C. and a pressure of at least about 1,500 psi. The separation solution is then contacted with the organic mixtures while maintaining the temperature and pressure as above until the mixtures and solution reach equilibrium to extract the preselected low molecular weight components from the organic mixtures. Finally, the entrainer/extracted components portion of the equilibrium mixture is isolated from the separation solution.

34 Claims, 1 Drawing Sheet

GEL PERMEATION CHROMATOGRAMS ON 100 Å POLYSTYRENE–DIVINYL BENZENE GEL WITH TETRAHYDROFURAN SOLVENT.

GEL PERMEATION CHROMATOGRAMS ON 100 Å POLYSTYRENE-DIVINYL BENZENE GEL WITH TETRAHYDROFURAN SOLVENT.

SUPERCRITICAL SEPARATION PROCESS FOR COMPLEX ORGANIC MIXTURES

CONTRACTUAL ORIGIN OF THE INVENTION

The United States Government has rights in this invention under Contract No. DE-AC02-83CH10093 between the United States Department of Energy and the Solar Energy Research Institute, A division of the Midwest Research Institute.

This application is a continuation, of application Ser. No. 154,210, filed Feb. 10, 1988, now abandoned.

BACKGROUND OF THE INVENTION

1. Field of the Invention

The present invention relates generally to the separation of complex organic mixtures into various components and, more particularly, to processes of separating low molecular weight fractions from complex organic mixtures utilizing supercritical solutions and is a continuation of U.S. application Ser. No. 154,210 filed on Feb. 10, 1988, now abandoned. Specifically, the present invention relates to the supercritical separation of low molecular weight components from complex organic mixtures utilizing supercritical carbon dioxide modified by the presence of an entrainer.

2. Description of the Prior Art

There are a wide variety of industrial biomass processing systems which produce waste streams containing substantial portions of useful constituents. Examples of such industrial systems include those involved in the manufacturing of pulp and paper such as black liquor solutions in kraft processes, in the production of cheese and whey, and in other biomass processing systems. The annual volume of such waste processing streams is very substantial. Thus, there have been numerous efforts over the years to separate useful components from such waste streams for the purpose of recirculation within the processing system, for the separate sale and/or use of such components, or for environmental purposes to remove environmentally damaging components from the waste streams. Due to the volume involved in such industrial systems, economic factors such as the complexity of the separation process or the energy requirement for such separation processes become extremely important as compared to the efficiency of the separation process as well as the effectiveness in terms of extraction capability.

For example, the kraft process of converting wood into cellulose pulp includes treating the lignocellulosic material with sodium hydroxide/sulfide solutions. During this process, lignins are dissolved and hemicelluloses are degraded to a complex mixture of organic compounds including various carboxylic acids such as saccharinic acids. Low molecular weight components such as phenolic compounds derived from lignins are present in streams of the black liquor or in washing operations such as preparation of chemically pure cellulose by dissolution of pulp in alkaline solutions.

The separation of large molecular weight components is relatively straightforward, and many prior art techniques have been developed to separate such high molecular weight components from the complex organic mixtures. Some techniques have also been developed for the separation of the low molecular weight fractions. These prior art techniques contain many stages involving ion exchange, adsorption steps, water evaporation, distillation, and other purification operations. These standard and well known procedures are very complex and expensive to operate. In order to increase the efficiency of separation, use of supercritical fluids to enhance separation has been developed. U.S. Pat. No. 3,969,196 is an example wherein a number of organic compounds are separated utilizing a wide variety of supercritical fluids including carbon dioxide. While carbon dioxide is a desirable supercritical fluid due to its relative availability and inexpensiveness, this particular reference was unable to separate the more complex polyhydroxy compounds and other complex phenolic low molecular weight compounds utilizing carbon dioxide and, instead, had to utilize different supercritical fluids having differing solvation characteristics. These supercritical fluids are more complex to handle and more expensive than supercritical carbon dioxide.

Other references which disclose the use of carbon dioxide in separation processes include U.S. Pats. No. 2,772,965, No. 4,349,415, No. 4,437,939 and No. 4,474,994. None of these references illustrate the use of supercritical carbon dioxide to extract the more complex phenolic low molecular weight constituents from complex organic mixtures, nor do they illustrate the modification of the carbon dioxide solvating power by the addition of entrainers. Thus, these known processes do not address the effective separation of simple and complex low molecular weight constituents of complex organic mixtures (phenolic, complex hydroxyacids) from biomass processing systems utilizing inexpensive supercritical fluids.

U.S. Pats. No. 2,631,966, No. 2,632,030 and No. 2,698,278 all illustrate the use of liquid carbon dioxide with other co-solvents for separation purposes. However, these patents are limited to petroleum refining and do not deal with carbon dioxide at supercritical conditions, that is supercritical temperature and pressure conditions. Moreover, the compounds present in oil stocks for petroleum refining have very little in common with separation processes of complex organic mixtures derived from biomass processing systems as discussed above.

Thus, there remains a need for relatively simple processes of extracting useful low molecular constituents from complex organic mixtures derived from biomass processing streams. For such processes to be economically effective, they must preferably utilize mild temperature conditions and intermediate pressure ranges, they must be simple, and they must utilize relatively inexpensive chemical components as well as simplified hardware.

SUMMARY OF THE INVENTION

Accordingly, it is one object of the present invention to provide a simplified and economic process for separating low molecular weight fragments or components from complex organic mixtures.

It is another object of the present invention to provide a process for modifying the solvation characteristics of supercritical carbon dioxide to increase its effectiveness in extracting low molecular weight components, including complex components, from complex organic mixtures derived from biomass processing systems.

It is a further object of the present invention to provide an economic supercritical extraction process for the separation of low molecular weight components from lignin-containing organic mixtures derived from various biomass processing systems such as the kraft wood pulp process.

Yet another object of the present invention is to provide a process for separating complex polyhydroxy compounds, complex phenols, low molecular weight lignin-containing compounds and hydroxycarboxylic acids from complex organic mixtures.

Still another objective of the present invention is to provide a process for separating high-value hydroxy acids and complex amino acids from solution, useful in food processing and pharmaceutical synthesis.

Additional objects, advantages and novel features of the present invention shall be set forth in part in the description that follows, and in part will become apparent to those skilled in the art upon examination of the foregoing or may be learned by the practice of the invention. The objects and advantages may be realized and attained by means of the instrumentalities and in combinations particularly pointed out in the appended claims.

To achieve the foregoing and other objects and in accordance with the purpose of the present invention, as embodied and broadly described herein, a process is disclosed for separating low molecular weight components from complex aqueous organic mixtures. The process includes preparing a separation solution of supercritical carbon dioxide with an effective amount of an entrainer to modify the solvation power of the supercritical carbon dioxide and extract preselected low molecular weight components. This separation solution is maintained at a temperature of at least about 70° C. and at a pressure of at least about 1,500 psi. The separation solution is contacted with the complex organic mixtures while maintaining the aforementioned temperature and pressure until the mixtures and the separation solution reach equilibrium to extract the preselected low molecular weight components from the organic mixtures. Finally, the entrainer/extracted components portion is isolated from the separation solution.

BRIEF DESCRIPTION OF THE DRAWINGS

The accompanying drawing which is incorporated in and forms a part of the specification illustrates preferred embodiments of the present invention, and together with the description, serves to explain the principles of the invention. In the drawing.

DETAILED DESCRIPTION OF THE PREFERRED EMBODIMENTS

Figure 1:
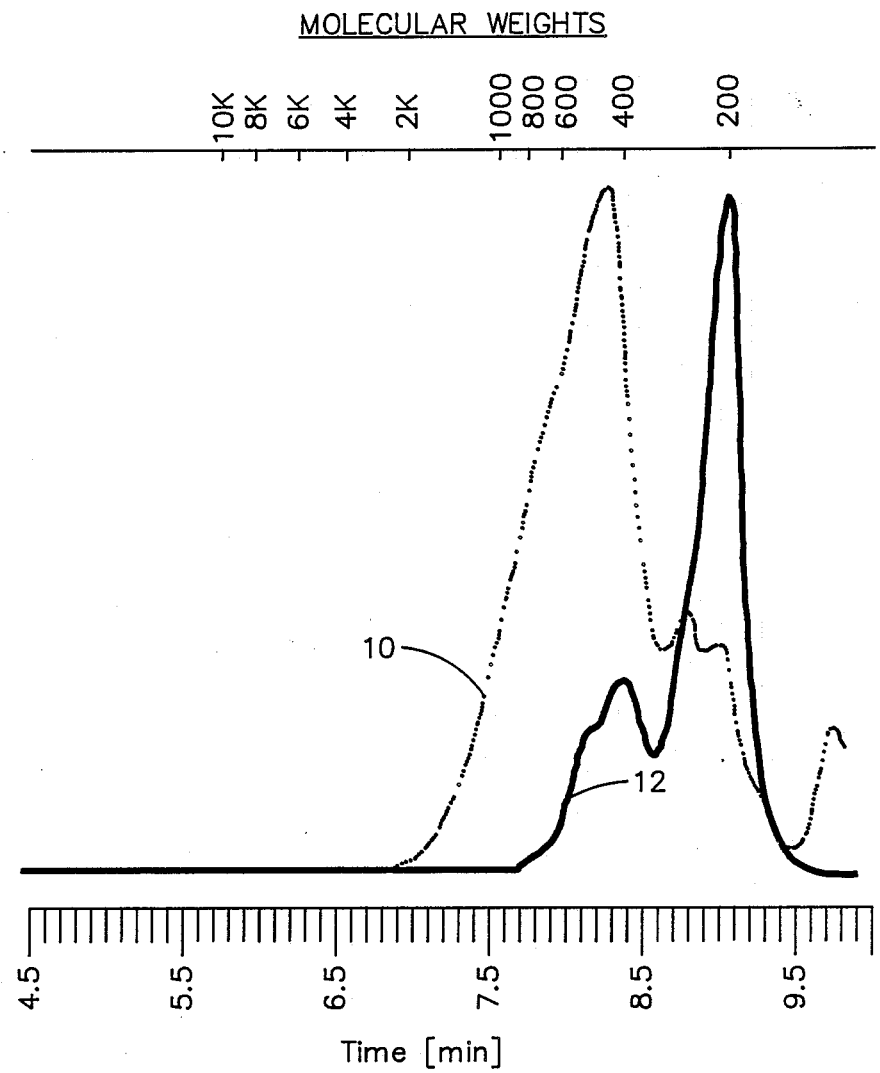
FIG. 1 is a graphical illustration showing molecular weight fragments extracted from a black liquor solution utilizing the process of the present invention.

The present invention involves a process for the extraction and separation of classes of components from complex aqueous mixtures of organic compounds such as those present in liquors from alkaline wood pulping such as the kraft process, pulp washing with alkaline solutions for the manufacture of chemically pure cellulose, cheese manufacturing waste streams and the like. The process utilizes supercritical carbon dioxide in the presence of entrainers. It was found that supercritical carbon dioxide in and of itself was insufficient to extract the desired low molecular weight fragments from such complex aqueous organic mixtures, and in particular the polyhydroxy compounds and other complex organic materials. It was found, however, that when effective amounts of entrainers were incorporated with the supercritical carbon dioxide, such entrainers modified the solvation power of the supercritical carbon dioxide and permitted the desired extraction of preselected fragments.

The supercritical solution of the invention is maintained at a temperature of at least 70° C. and an operating condition of at least about 1,500 psi. The preferred ranges, as discussed in more detail below, include a temperature range of 70°–150 ° C. and operating pressures in the range of 1,500–4,000 psig.

The supercritical fluid extraction solution is then contacted with the aqueous solution of the complex mixture of organic compounds until equilibrium is reached. A counter-current mode is preferably utilized to achieve this, although any desired process system may be utilized. After equilibrium is established between the mixtures, the supercritical solvent contains one or more low molecular weight components of the complex organic mixture depending on the nature and the concentration of the entrainer present in the supercritical solution. It should be noted here, and is discussed in greater below, that it is possible to successively extract different classes of compounds by varying the concentration and/or the nature of the entrainer present in the supercritical carbon dioxide. In this manner, the process may be tuned to achieve the desired extraction. The solution of entrainer/extracted components is then isolated by reducing the system pressure, by lowering the temperature, or by a combination of both. In a preferred embodiment, the pressure is lowered to about 800 psi or higher. Alternatively, the system's temperature may be lowered in the amount of 30°–50° C. from its operational temperature. The entrainer/extracted material suspension resulting from this procedure can then be filtered with the entrainer being recovered and recycled.

The broadest application of the present invention includes a process for generally separating low molecular weight fragments or components from soluble complex organic mixtures. In particular, the separation of certain components from complex organic mixtures is of concern wherein the organic mixtures include substituted phenols, hydroxycarboxylic acids, complex carbohydrates, amino acids and the like. Of particular concern are biomass processing streams as previously described and in particular the kraft process for converting wood into cellulose pulp. This process system treats the lignocellulosic material with sodium hydroxide/sulfide solutions to dissolve lignins and degrade hemicelluloses to a complex mixture of carboxylic acids including saccharinic acids. The black liquor solution produced in such processing systems is of particular importance because of the amount of chemicals it contains. Thus, a particularly important application of the present invention is the separation and extraction of low molecular weight compounds, such as substituted phenols and other phenolic compounds derived from lignins from hydroxycarboxylic acids and other polyhydroxy compounds. Such components are present in streams of the black liquor or in washing operations relating to the overall kraft process.

More particularly, black liquor from pulp and paper industry processes is generally concentrated to about 30–50% volume, and carbon dioxide (80 psi, 80° C.) is then typically utilized to precipitate about 70–80% of the lignins present in the liquor, primarily the higher molecular weight lignin components. The residual solution, which is of concern with the present invention, contains salts, low molecular weight lignins, and polyhydroxy compounds such as hydroxycarboxylic acids including saccharinic acids as sodium salts. After separation of the solids by filtration or centrifugation, the resulting liquor is then treated with the supercritical carbon dioxide separation process of the present invention to selectively extract desired components thereof.

The entrainers useful with the present invention may vary depending on the mixture being separated and the desired extraction fragments. Preferably, the entrainer is a low boiling point organic solvent and is present in approximately 2-30 weight percent of the supercritical carbon dioxide/entrainer solution to be effective. In addition, in order to extract polyhydroxy compounds, the entrainer should include active hydroxy groups in the presence of water. This is particularly true in the black liquor extraction application of the invention. Suitable compounds utilized as entrainers include alcohols such as methanol, ethanol and the like, ketones such as acetone, methylethylketone and the like, and ethers such as tetrahydrofuran (THF) and methyl-t-butyl ether. Such entrainers will extract low molecular weight fragments preferably in the range of 150-400 molecular weight.

As previously indicated, the preferred effective range of entrainer is 2-30 weight percent of the separation solution depending on the entrainer utilized and/or the desired extractant. When alcohol is utilized as the entrainer, the greater the alcohol content, the greater the lignin extracted from lignin-containing complex organic mixtures. More specifically, a low alcohol content of about 2-5% will extract low molecular weight phenolics. A medium alcohol concentration of about 10-12% of the supercritical carbon dioxide will extract hydroxy acids such as lactic acid, and a higher alcohol concentration of about 20% or more will extract the more complex hydroxy acids such as polyhydroxy carboxylic acids, and amino acids (in pharmaceutical processes)

It is also possible to successively extract different classes of compounds or components from the complex organic mixture by varying not only the concentration but also the nature of the entrainer present. For example, in order to extract the polyhydroxy components, the entrainer utilized must have an active hydroxy group. Moreover, by shifting the entrainer type from alcohol to, for example, acetone or THF, extraction of phenolics is greatly enhanced or increased as opposed to extraction of hydroxy acids or amino acids. Thus, by extensively modifying the solvation power of the supercritical carbon dioxide by the addition of various types of entrainers, especially when such entrainers include active hydroxy groups, separation of a variety of complex low molecular weight fractions can be performed, particularly polyhydroxy compounds. In addition, by tuning the amount of the entrainer, such as alcohol, one can selectively extract desired components such as progressively extracting phenolic compounds, then simpler hydroxyacids, and then more complex polyhydroxycarboxylic acids from the black liquor solution. For more particulars, reference should be made to Table III below.

As previously indicated, the preferred temperature range for maintaining the supercritical separation solution is between 70°-150° C. At temperatures generally below the preferred minimum of 70° C., very little extraction of low molecular weight fragments is obtained. If the separation solution is operated at temperatures substantially greater than the preferred 150° C. maximum, components of the situation solution begin to decompose thereby defeating the effectiveness and capability of the extraction process. It is also preferred that the supercritical separation solution is operated at a pressure range of about 1,500-4,000 psi. These particular pressure range parameters have been experimentally determined as being the preferred range to operate the separation solution at or above the supercritical range of carbon dioxide, which is 31° C. at 1,089 psig.

Once the supercritical separation solution and the organic mixtures have reached equilibrium, the entrainer/water/extracted fragment composition is then isolated from the separation solution. This is achieved either by reducing the pressure or by reducing temperature or both. In one preferred form, the pressure is reduced to approximately 800 psi, although lower pressures down to 200 psi would work and have been used experimentally. However, 800 psi or higher is preferred in order to maintain the carbon dioxide solution as a liquid. In this instance, suspended particulates are formed, and the suspension is then filtered to recover the entrainer and solidified fragments. In an alternate embodiment, the volatile entrainer/water is stripped off the solution after pressure reduction, and the fragments are then recovered. Alternatively, the temperature may be reduced. The preferred temperature drop is 30°-50° C. although a greater drop may be used. However, it should be noted that the smaller the temperature drop, the easier it is to recycle the solution in a continuous process system.

EXAMPLES I-VIII

A series of experiments were performed to determine the parameters and limitations indicated above. All experiments were carried out in an Autoclave Engineer SCE Screening System. All the experiments with liquid samples were carried out in an extraction vessel which was modified to include an internal tube through which the supercritical fluid was fed and bubbled into the liquid aqueous phase to improve the mixing between the phases. A typical experimental procedure is described to provide a detailed record of experimental sequence of the operations.

The carbon dioxide/entrainer mixture was prepared in a small cylinder having a volume of about 2.7 liters. The cylinder was carefully emptied by connecting it to vacuum line and then weighed. The desired amount of entrainer was siphoned into the cylinder. The cylinder was weighed again and then pressurized with carbon dioxide to the desired weight. It was necessary to pressurize slowly to maximize the carbon dioxide content.

Low boiling solvents such a methanol or acetone or tetrahydrofuran (THF) dissolved large amounts of carbon dioxide, so it was possible to fill the cylinder with about 300-350 g of solvent and 1,200-1,400 g of carbon dioxide. Solvents like ethanol or isopropanol and possibly acetonitrile and methylethylketone do not dissolve very large amounts of carbon dioxide so that is was better to fill the cylinder with no more than 150-200 g of such solvents.

The cylinder was connected to an extraction reaction system, and a cold trap (ice, water and sodium chloride) was prepared to cool the carbon dioxide/entrainer mixture before entering a pump. Usually, the extraction reactor was filled with 10 ml of solution to be extracted. It was then connected and slowly and carefully pressurized. Once the pressure began to rise, the solution was then heated to the desired temperature.

In a typical experiment (3,000 psi, 100° C. and 20% of entrainer), the pressure in the separating vessel was kept at about 300 psi. Approximately 2.1 cubic foot volume was allowed to pass through the reactor before each fraction was collected. Once the final fraction was recovered from the separating vessel, the system was completely vented. Heating was turned off when the pressure in the system was at about 1,000 psi during discharge of the system. The liquid sample was recovered from the bottom of the autoclave and weighted. Usually there was a solid ar the bottom and on the walls of the reactor. This solid sample was carefully recovered, dried under vacuum and weighed.

A series of samples of black liquor were tested utilizing the carbon dioxide/entrainer process of the present invention wherein the type of entrainer utilized was varied. Samples of the black liquor solution were prepared, for instance, by pulping selected species such as pine or aspen to obtain the kraft black liquors. Additional samples were obtained from the Weyerhaeuser Company. In all these experiments, the volume of black liquor put into the reactor was 10 ml, containing approximately 1 g of lignin. Kraft black liquor solutions were first treated to remove the higher molecular weight lignin components, with the remaining solution treated with the extraction process of the present invention. Table I below provides the results of this series of experiments which were a series of extractions of aspen kraft black liquor after precipitation of high-molecular-weight lignins with carbon dioxide.

TABLE I

| Exp No. | Entrainer, Wt % | Quantity of Supercritical Fluid, g | Entrainer Recovered, g | Extract, g |
|---|---|---|---|---|
| 1 | Acetone, 21.1 | 620 | 135 | 0.16 |
| 2 | Acetone, 20.0 | 625 | 124 | 0.14 |
| 3 | Methanol, 22.5 | 613 | 153 | *1.44 |
| 4 | Methanol, 20.5 | 830 | 178 | *1.33 |
| 5 | Ethanol, 19.3 | 460 | 103 | 0.63 |
| 6 | Ethanol, 17.9 | 580 | 117 | 0.40 |
| 7 | THF 21.5 | 510 | 89 | 0.11 |
| 8 | THF 21.5 | 600 | 119 | 0.16 |

*The extract comprised low molecular weight lignin compounds and hydroxycarboxylic acids.

As can be seen from Table I above, both acetone and THF entrainers with the supercritical carbon dioxide extracted low molecular weight lignins. This can also be seen in FIG. 1 wherein the line denoted by the numeral 10 indicates the molecular weight distribution (MWP) of the residue from the black liquor after having been extracted with supercritical carbon dioxide and acetone, while the line 12 indicates the MWD of the extracted lignin. As can be seen from FIG. 1, the extracted lignin is in a low molecular weight range of approximately 200, with a small amount of lignin also in the molecular weight range of approximately 400. Thus, while the acetone and THF extracted low molecular weight lignins, as illustrated, the alcohols as indicated in Table I extracted hydroxycarboxylic acids in addition to the low molecular weight lignins. Moreover, methanol can also extract some sodium bicarbonate, which is not extracted with acetone or THF.

EXAMPLE IX 200 ml of crude black liquor solution was treated by exposing it to carbon dioxide (80 psi at 80° C.) for approximately three hours. High molecular weight lignin precipitated out and was separated by centrifugation. 10 ml (11 g) of the supernatant fluid were then extracted using the process of the present invention, the supercritical carbon dioxide/methanol entrainer being at 100° C., 3,000 psig. With 5% methanol, 16 mg of acetovanillone were obtained with about 5 g of methanol. When the methanol content was increased to about 17%, 800 mg of a mixture of lactic and other hydroxy acids were obtained with about 50 g of methanol. The proportions of methanol/carbon dioxide needed for an industrial process would be smaller than those employed in these particular experiments. The operating vessel volume was 75 ml and the flow rate of carbon dioxide/methanol was about 300-400 ml/hr. Acetovanillone contents in the liquor were about 1% of lignin, and the expected content of saccharinic acids was about 10-20%. This particular application of the process of the invention would apply to the isolation of acetovanillone and related compounds and the subsequent isolation of saccharinic acids from complex mixtures of industrial interest.

EXAMPLE X

An experiment similar to Example IX was carried out using about 17% methanol concentration and the Weyerhaeuser kraft lignin sample described above. F om about 2.2 g of solid material contained in the liquor. 50% was extracted with 17% methanol and supercritical carbon dioxide and 50% remained in the solid residue. The composition of the extracted phase and of the solid residue, relative to the hydroxycarboxylic acids, is illustrated in Table II below.

TABLE II

Composition of Hydroxycarboxylic Acids in Extracted Materials and Residue.
(Hydroxymonocarboxylic Acids in g/100 g of material*)

|  | Extract | Residue |
|---|---|---|
| Lactic | 3.17 | 0.23 |
| Glycolic | 1.22 | 0.32 |
| 2-Hydroxybutanoic | 1.21 | 0.07 |
| 2-Hydroxy-2-methylbutanoic | 0.04 | — |
| 2-Hydroxypentenoic | 0.19 | traces |
| 4-Hydroxybutanoic | 0.14 | — |
| 2-Methylglyceric | 0.09 | 0.02 |
| Glyceric | 0.03 | 0.02 |
| 3-Deoxytetronic | 0.20 | 0.05 |
| 3,4-Dideoxypentonic | 1.71 | 0.27 |
| Anhydroisosaccharinic | 0.16 | 0.05 |
| Xyloisosaccharinic | 0.44 | 0.17 |
| 3-Dideoxypentonic | 0.25 | 0.09 |
| 3,6-Dideoxyhexonic | 0.11 | traces |
| 3,4-Dideoxyhexonic | 0.10 | 0.02 |
| b-Glucoisosaccharinic | 3.31 | 1.30 |
| a-Glucoisosaccharinic | 1.27 | 0.56 |

*Lignin residues and salts were not analyzed.

The data in Table II illustrate the ability of the high methanol concentrations to extract simple and complex hydroxycarboxylic acids. These conditions also extract dicarboxylic acids and glycerol. These are also components of the black liquor. The analyses above were carried out using capillary gas chromatography of fully sylilated derivatives.

EXAMPLES XI–XXII

To optimize entrainer concentration and operating conditions, experiments were performed with a simple simulated black liquor solution containing acetovanillone (representative of a low-molecular weight lignin derived compound), lactic acid (a carbohydrate decomposition product), and gluconic acid (a more complex hydroxycarboxylic acid, representative of saccharinic acids). Table II below summarizes the effects of the various parameters: concentration of entrainer, temperature, pressure and water content. Analyses were performed using high performance liquid chromatography on the column Biorad HPX - 87H.

has particular applicability to selectively extract reusable components from black liquor waste streams in the kraft pulping process as well as other biomass processing systems having waste streams. It can also be applicable to the extraction of high value complex compounds from various processing streams (biological or chemical

TABLE III

| Expt # | P (psi) | Temp (°C.) | Entrainer Solvent | Entrainer (%) | Gluconic[b] Xtd. | (Yield %) SR | (Yield %) LR | Lactic Xtd | (Yield %) SR | (Yield %) LR | Acetovanillone (Yield %) Xtd. | Acetovanillone SR | Acetovanillone LR | Gluconic 100-SR-LR |
|---|---|---|---|---|---|---|---|---|---|---|---|---|---|---|
| Variation of methanol content | | | | | | | | | | | | | | |
| 48 | 3000 | 100 | MeOH | 20.6 | 67.1 | 2.1 | 15.2 | 93.7 | 0.0 | 0.0 | 98.4 | 0.0 | 0.0 | 82.7 |
| 54 | 3000 | 100 | MeOH | 13.4 | 27.8 | 20.6 | 3.5 | 88.3 | 0.0 | 1.8 | 90.3 | 0.0 | 0.0 | 75.9 |
| 55 | 3000 | 100 | MeOH | 8.4 | 2.6 | 70.7 | 4.5 | 29.8 | 6.1 | 60.5 | 83.7 | 4.0 | 9.0 | 24.8 |
| 56 | 3000 | 100 | MeOH | 5.7 | 0.2 | 3.3 | 88.4 | 4.5 | 2.1 | 100.1 | 76.6 | 1.7 | 25.1 | 8.3 |
| 60 | 2500 | 100 | MeOH | 20.3 | 54.5 | 35.7 | 6.6 | 100.3 | 0.0 | 0.9 | 102.5 | 0.0 | 0.0 | 57.7 |
| 61 | 2000 | 100 | MeOH | 20.3 | 33.4 | 51.0 | 4.0 | 109.4 | 0.0 | 3.4 | 94.1 | 0.0 | 3.6 | 45.1 |
| Variation of temperature and alcohol type | | | | | | | | | | | | | | |
| 48 | 3000 | 100 | MeOH | 20.6 | 67.1 | 2.1 | 15.2 | 93.7 | 0.0 | 0.0 | 98.4 | 0.0 | 0.0 | 82.7 |
| 53 | 3000 | 100 | EtOH | 19.3 | 15.5 | 51.4 | 0.5 | 85.5 | 0.0 | 0.6 | 94.7 | 0.0 | 0.0 | 48.1 |
| 58 | 3000 | 70 | MeOH | 19.7 | 59.6 | 18.7 | 1.0 | 100.9 | 0.0 | 0.7 | 96.1 | 0.0 | 0.0 | 80.3 |
| 62 | 3000 | 120 | MeOH | 18.5 | 20.6 | 25.7 | 0.5 | 100.5 | 0.0 | 0.5 | 96.7 | 0.0 | 0.0 | 73.8 |
| 67 | 3000 | 100 | MeOH* | 20.6 | 0.0 | 102.7 | 0.4 | 0.8 | 80.9 | 4.4 | 24.7 | 42.1 | 17.4 | −3.1 |
| 68 | 3000 | 100 | MeOH# | 20.6 | 61.1 | 7.1 | 17.2 | 98.7 | 0.0 | 0.5 | 97.0 | 0.0 | 0.0 | 75.6 |
| 69 | 3000 | 100 | MeOH+ | 17.6 | 73.2 | 0.9 | 10.2 | 95.3 | 0.0 | 0.3 | 94.8 | 0.0 | 0.1 | 89.0 |

*Extraction from solid sample, no water present in the system
Extraction from acidic solution (pH 3-4)
+MeOH in entrainer contained 5% water
Xtd Extracted fraction
SR Solid residue formed primarily on pressure reduction
LR Liquid residue
[b]Concentration of gluconic acid best determined by difference (100-SR-LR) since upon cooling part of the acid precipitated from the methanolic solution From the results of Table III, it is clear that one can extract lignin-like compounds at very low entrainer (e.g. methanol, ethanol) concentration in the 2,000–4,000 psi range at the investigated temperature range. In order to extract the carboxylic acids, it is imperative to increase the concentration of entrainer (methanol or ethanol). It should also be noted that the entrainer from these particular experiments has to have an active hydroxy group or other polar group to allow extraction of polyhydroxylated carboxylic acids. If the chief interest is in acetovanillone production, methanol, ethanol, acetone, tetrahydrofuran and the like can be used as entrainers. If the compounds of interest are the acids as well, methanol and ethanol are the preferred entrainers.

EXAMPLES XXIII-XXIV

Other examples of substances that can be extracted with supercritical carbon dioxide with methanol entrainer were also tested. In one example, 0.27 g of Ascorbic acid was dissolved in 10 ml of water. The Ascorbic acid was completely extracted at 95° C. and at 3000 psi carbon dioxide containing 17% methanol with roughly 30 g of methanol or 0.5 h continuous extraction. Another example utilized the same procedure as just described. However, L-Alanine (an amino acid) was substituted for the ascorbic acid, and complete extraction also occurred in this example.

These examples XXIII and XXIV clearly illustrated that the use of methanol and water with supercritical carbon dioxide allows the extraction of polar compounds having active -COOH, -OH and -NH$_2$ groups.

As can be seen from the above, a novel process for extracting or separating low molecular weight components of complex organic mixtures is provided. The process is simple and economic since it is a modification of supercritical carbon dioxide separation, carbon dioxide being a very inexpensive and readily available extractant material. As can be seen, the present invention processes). By merely modifying the type and concentration of entrainer associated with the supercritical carbon dioxide, one can select the material being extracted from the complex organic mixture. Thus, the process is very adaptable to numerous industrial systems, is simple and economic, and is easily adapted and modified in accordance with the desired, preselected low molecular weight extracted material.

While the foregoing description and illustration of the present invention has been particularly shown in detail with reference to preferred embodiments and modifications thereof, it should be understood by those skilled in the art that the foregoing and other modifications are exemplary only, and that equivalent changes in composition and detail may be employed therein without departing from the spirit and scope of the invention as claimed except as precluded by the prior art.

The embodiments of the invention in which an exclusive property or privilege is claimed are defined as follows:

1. A process for separating low molecular weight components having a molecular weight in the range of 150 to 400, from complex aqueous organic mixtures comprising:
   preparing a separation solution of supercritical carbon dioxide with an effective amount of a low boiling point entrainer selected from the group consisting of methanol, ethanol, acetone, methylethylketone, tetrahydrofuran and methyl-t-butyl ether to modify the solvation power of said supercritical carbon dioxide and extract preselected low molecular weight components;
   maintaining said separation solution at a temperature of at least about 70° C. and a pressure of at least about 1500 psi;
   contacting said separation solution with said organic mixtures while maintaining said temperature and pressure until the mixtures and solution reach equilibrium to extract said preselected low molecular weight components from said organic mixtures; and isolating the entrainer/extracted components portion from said separation solution by reducing the pressure, lowering the temperature, or a combination of reducing the pressure and lowering the temperature.

2. The process as claimed in claim 1, wherein said temperature ranges from 70°-150° C., and said pressure ranges from 1,500-4,000 psi.

3. The process as claimed in claim 1, wherein said entrainer includes active hydroxy groups in the presence of water to selectively extract polyhydroxy carboxylic acid or amino acids from said complex organic mixtures.

4. The process as claimed in claim 3, wherein said polyhydroxy compounds include polyhydroxycarboxylic acids.

5. The process as claimed in claim 1, wherein said entrainer comprises an effective amount of methanol and water to selectively extract polar compounds having active -COOH, -OH or -NH$_2$ groups.

6. The process as claimed in claim 1, wherein said effective amount of entrainer in said separation solution comprises 2-30% by weight.

7. The process as claimed in claim 1, wherein said low molecular weight components which are separated from said complex organic mixture comprise 150-400 molecular weight.

8. The process as claimed in claim 1, wherein said complex organic mixtures from which said low molecular weight components are separated are selected from the group consisting of black liquor solutions derived from alkaline wood pulping processes, pulp working solutions from the manufacturing of chemically pure cellulose, and cheese manufacturing waste streams.

9. The process as claimed in claim 8, wherein said complex organic mixtures from which said low molecular weight components are separated include phenols, carboxylic acids, and complex carbohydrates, and wherein said low molecular weight components include hydroxycarboxylic acids and substituted phenols.

10. The process as claimed in claim 1, wherein the entrainer/extracted components portion is isolated by reducing the pressure of the equilibrium solution thereby creating suspended fragments therein.

11. The process as claimed in claim 10, wherein said isolation further includes filtering the suspension and recovering the entrainer.

12. The process as claimed in claim 10, wherein said isolation includes stripping off the volatile entrainer solution to leave the extracted components.

13. The process as claimed in claim 1, wherein said preselected low molecular weight components are progressively separated in accordance with their molecular weight from said complex organic mixtures by progressively changing the entrainer concentration in the supercritical carbon dioxide/entrainer separation solution.

14. The process as claimed in claim 13, wherein low molecular weight lignin compounds are separated from said complex organic mixture by utilizing a low entrainer concentration in said separation solution, and wherein the entrainer concentration is increased to shift the extraction and separation to separating carboxylic acids from the lignin-containing complex organic mixtures.

15. The process as claimed in claim 14, wherein said entrainer includes active hydroxy groups to extract polyhydroxylated carboxylic acids.

16. The process as claimed in claim 13, wherein said entrainer comprises an alcohol, and wherein said alcohol concentration is selectively varied from 2% to 30% depending on the desired selected low molecular weight extraction component.

17. The process as claimed in claim 16, wherein said alcohol entrainer concentration is in the range of about 2-5% by weight to selectively extract low molecular weight phenolics.

18. The process as claimed in claim 16, wherein said alcohol entrainer concentration is in the range of about 10-12 weight percent to selectively extract hydroxy acids.

19. The process as claimed in claim 16, wherein said alcohol entrainer concentration is in the range of about 20-30% by weight to selectively extract complex polyhydroxy acids and amino acids.

20. The process as claimed in claim 1, wherein said preselected low molecular weight components are separated in accordance with their molecular weight from said complex organic mixtures by selectively changing the entrainer composition of the supercritical carbon dioxide/entrainer solution.

21. A process for extracting low molecular weight components having a molecular weight in the range of 150 to 400, from complex polyhydroxycarboxylic acid mixtures derived from biomass processing streams, said process comprising:

admixing a solution of supercritical carbon dioxide and an effective amount of a low boiling point organic entrainer selected from the group consisting of methanol, ethanol, acetone, methylethylketone, tetrahydrofuran and methyl-t-butyl ether to modify the solvation power of said supercritical carbon dioxide and extract preselected low molecular weight components;

maintaining said carbon dioxide solution at a temperature of about 70°-150° C. and a pressure of 1500-4000 psi, said carbon dioxide remaining at or about its supercritical level during the extraction phase;

contacting said carbon dioxide/entrainer solution with said polyhydroxy-carboxylic acid mixtures while maintaining said temperature and pressure until said solution is in equilibrium with said mixtures to extract said preselected low molecular weight components from said mixtures; and isolating the entrainer/extracted components from said solution by reducing the pressure, lowering the temperature, or a combination of reducing the pressure and lowering the temperature.

22. The process as claimed in claim 21, wherein said entrainer includes hydroxy groups to extract low molecular weight polyhydroxy carboxylic acid compounds.

23. The process as claimed in claim 21, wherein said effective amount of entrainer in said carbon dioxide/entrainer solution comprises 2-30% by weight depending on the preselected component desired to be extracted.

24. The process as claimed in claim 23, wherein the preselected component being extracted may be varied by varying the concentration and/or composition of said entrainer in the supercritical carbon dioxide/entrainer solution.

25. The process as claimed in claim 21, wherein the entrainer/extracted components composition is isolated by reducing the pressure of the equilibrium solution to about 800 psi or above.

26. The process as claimed in claim 21, wherein the entrainer/extracted components composition is isolated by reducing the temperature of the equilibrium solution by 30°-50° C.

27. A process for separating preselected low molecular weight lignin fragments, having a molecular weight in the range of 150 to 400, from soluble lignin-containing mixtures and complex polyhydroxycarboxylic acid comprising:
   preparing a solution of supercritical carbon dioxide and an effective amount of a low boiling point organic entrainer selected from the group consisting of methanol, ethanol, acetone, methylethylketone, tetrahydrofuran and methyl-t-butyl ether at a temperature of about 70°-150° C. and at a pressure of about 1500-4000 psi to maintain the carbon dioxide solution at or above its supercritical level and selectively extract the desired fragments;
   contacting the carbon dioxide/entrainer solution with the lignin-containing mixture until the solution and mixture are in equilibrium to extract the preselected low molecular weight fragments from the mixture; and
   isolating the entrainer/extracted fragments from the solution, by reducing the pressure, lowering the temperature, or a combination of reducing the pressure and lowering the temperature.

28. The process as claimed in claim 27, wherein said lignin-containing mixture comprises a black liquor mixture derived from alkaline wood pulping processes.

29. The process as claimed in claim 28, wherein said entrainer includes hydroxy groups in order to extract polyhydroxy carboxylic acid compounds from the black liquor mixtures.

30. The process as claimed in claim 29, wherein said effective amount of entrainer in said supercritical carbon dioxide/entrainer solution comprises approximately 2-30% by weight depending on the low molecular weight fragment desired to be extracted.

31. The process as claimed in claim 30, wherein the extracted component varies from low molecular weight lignin compounds to carboxylic acids as said entrainer concentration is increased in the supercritical carbon dioxide/entrainer solution.

32. The process as claimed in claim 27, wherein the entrainer/extracted fragments solution is isolated by reducing the pressure or the temperature of the mixture and solution in equilibrium.

33. The process as claimed in claim 32, wherein the entrainer/extracted fragments solution is isolated by reducing the pressure of the solution/mixture to approximately 800 psi or higher after the solution and mixture have reached equilibrium and the desired preselected fragments have been extracted from the mixture.

34. The process as claimed in claim 32, wherein the entrainer/extracted fragments solution is isolated by reducing the temperature of the solution/mixture by 30°-50° C. after the solution and mixture have reached equilibrium and the desired preselected fragments have been extracted from the mixture.

* * * * *